UNITED STATES PATENT OFFICE.

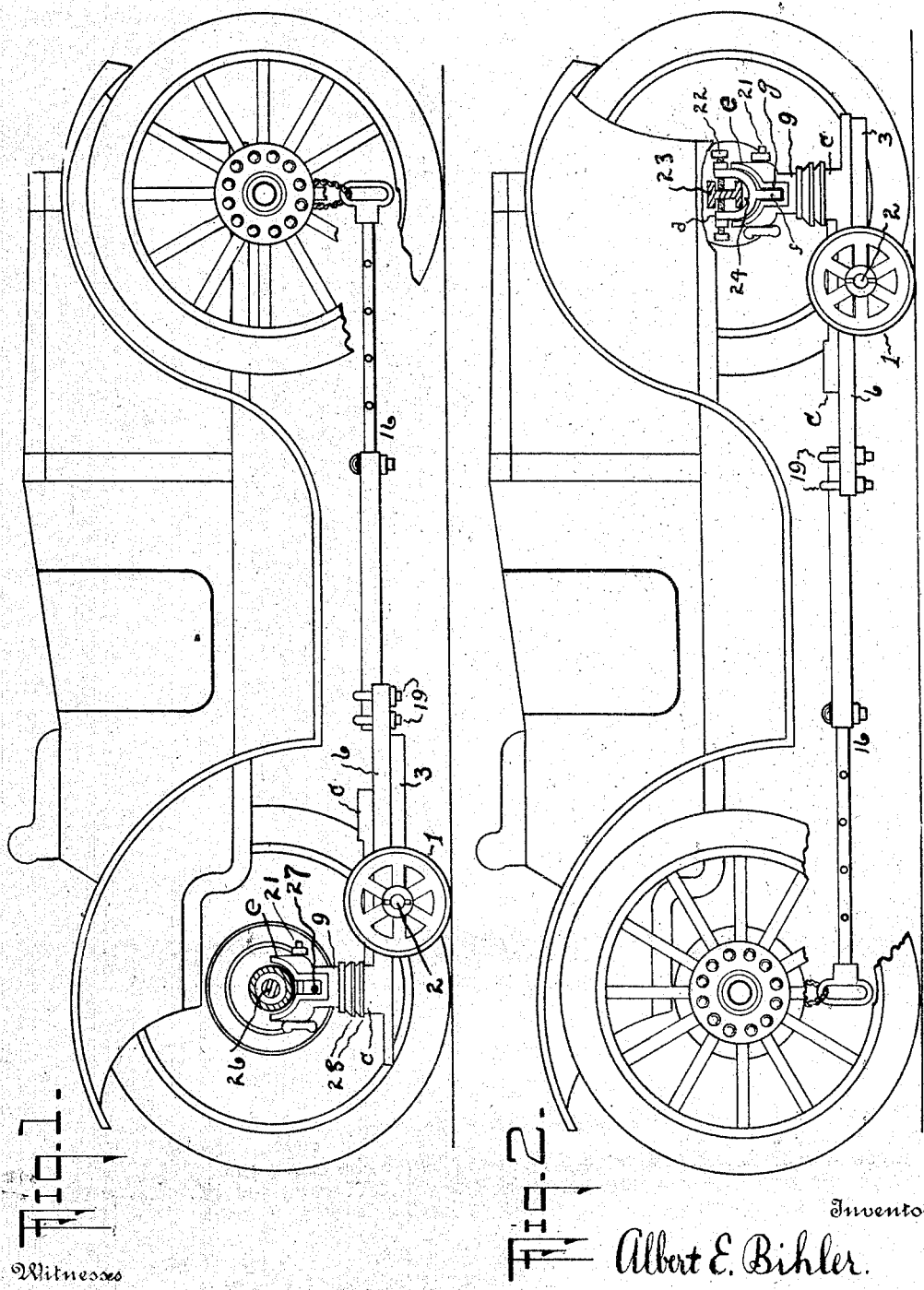

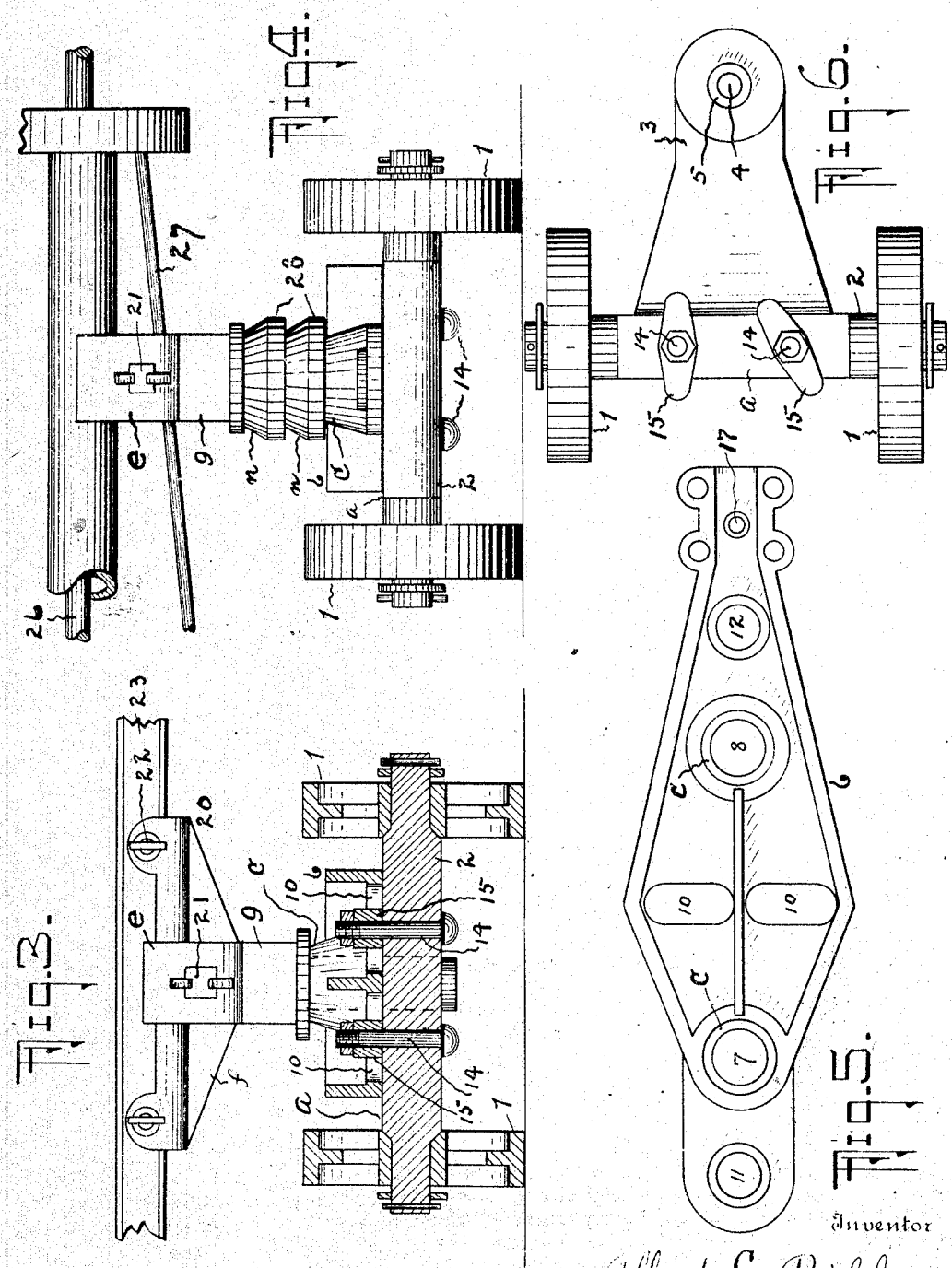

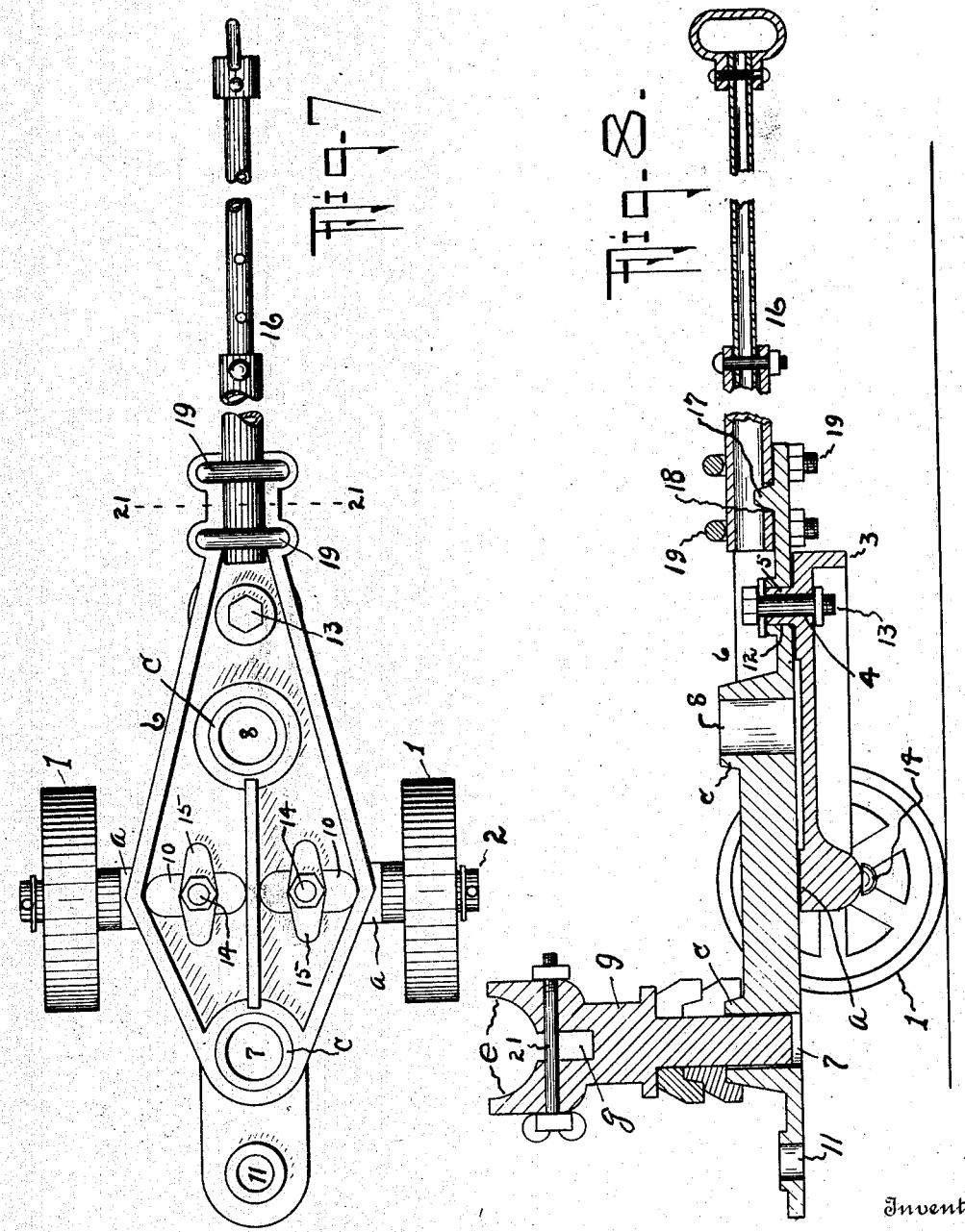

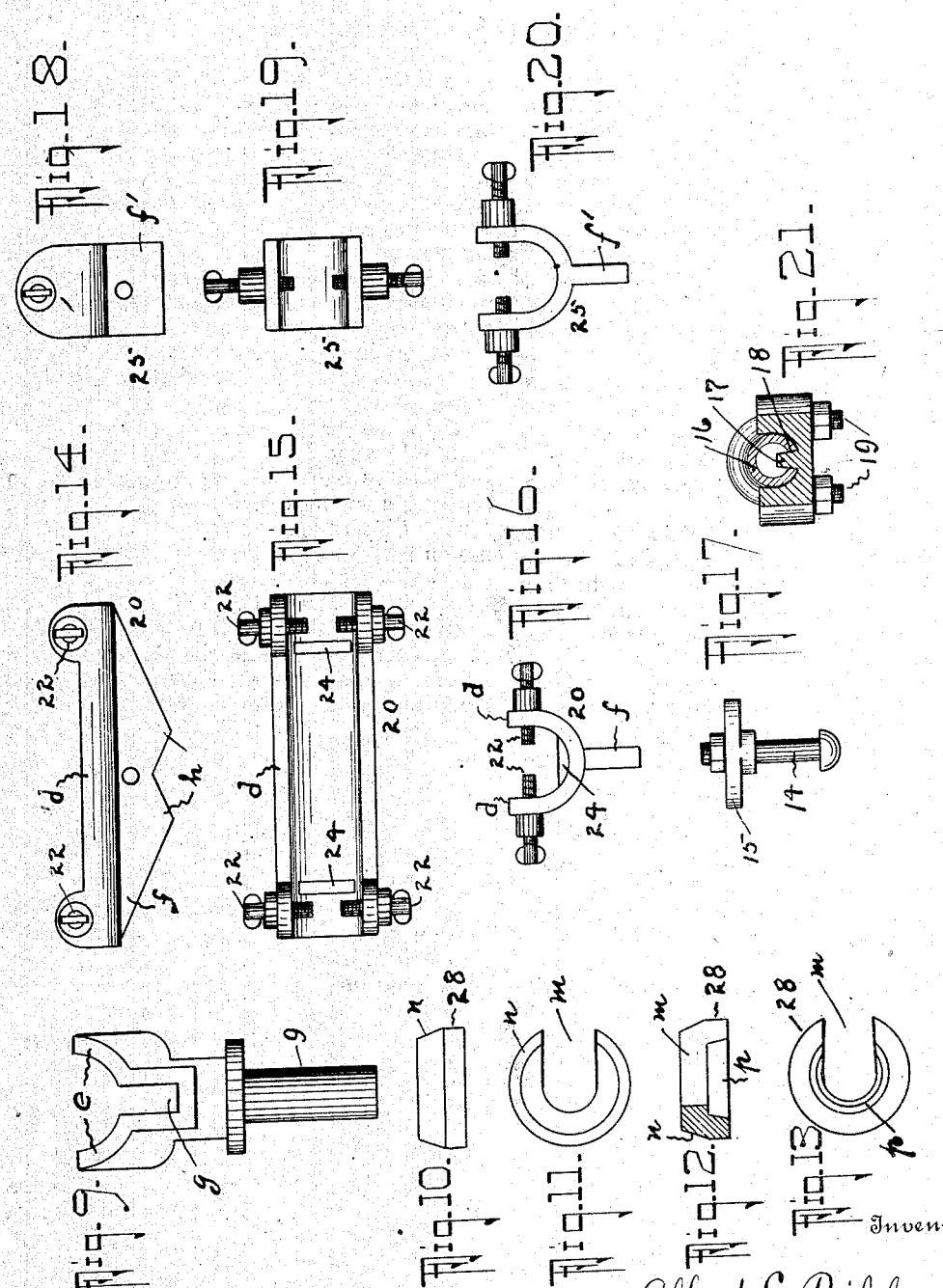

ALBERT E. BIHLER, OF OMAHA, NEBRASKA.

VEHICLE-TRUCK.

1,188,033.  Specification of Letters Patent.  Patented June 20, 1916.

Application filed January 27, 1916. Serial No. 74,579.

*To all whom it may concern:*

Be it known that I, ALBERT E. BIHLER, a citizen of the United States, residing at Omaha, in the county of Douglas and State of Nebraska, have invented certain new and useful Improvements in Vehicle-Trucks, of which the following is a specification.

This invention relates to vehicle trucks, and has for its object to provide a device for emergency use, particularly for motor vehicles, to sustain a part of the weight when either the front or rear axle or a wheel has been broken or injured, so that the vehicle may be brought to a garage for repairs, the truck being substituted for one or both wheels of an axle. The truck is also useful for supporting an axle when repairs are being made.

The invention includes a platform having a pivotal mounting on the truck and adapted to be reversed in its mounting for sustaining the weight of either a front or rear axle in a manner to permit the truck to be disposed between the front and rear axle in either instance for sustaining the weight to advantage since the pivotal mounting is always disposed in advance of the truck wheels to permit a limited swinging movement of the platform while sustaining the weight, this being a useful feature when moving a disabled motor car upon curves, or when adjusting the vehicle to desired positions when repairs are being made.

With the foregoing objects in view and others to be hereinafter mentioned, the invention presents a novel construction, combination and arrangement of parts, as described herein and claimed, and as illustrated in the accompanying drawings, wherein,—

Figures 1 and 2 are partly broken, side views of an automobile with the device applied thereto, Fig. 1 showing it used as a support for the rear, and Fig. 2 as a support for the front axle. Fig. 3 is a view showing the axle of the truck in longitudinal section, the parts being arranged for supporting the front vehicle axle. Fig. 4 is a rear view of the device, the parts being arranged for a support of one end of the rear vehicle axle. Fig. 5 is a plan view of the reversible platform. Fig. 6 is a plan view of the truck. Fig. 7 is a plan view showing the platform mounted on the truck. Fig. 8 is a view in longitudinal section of the parts shown in Fig. 7, a supporting pin being added and shown in section. Figs. 9 to 21 inclusive relate to details for clearly illustrating the operation to which they may be applied. Fig. 9 is a side view of an adjustable supporting-pin. Fig. 10 is a side view of a recessed washer used as a block or holder when an axle has been elevated. Fig. 11 is a plan view of the washer. Fig. 12 is a sectional view of the same. Fig. 13 is a bottom plan view of the washer. Fig. 14 is a view in side elevation of a rocking-saddle for use on a front axle when both vehicle wheels are disabled. Fig. 15 is a plan view of the same. Fig. 16 is an end view of the saddle shown in Figs. 14 and 15. Fig. 17 is a side view of one of the lug-holding bolts for limiting a swinging movement of the platform. Fig. 18 is a side view of a saddle for use on a front or rear vehicle axle when one wheel thereof is disabled. Fig. 19 is a plan view of the same. Fig. 20 is an end view of the saddle shown in Figs. 18 and 19. Fig. 21 is a section through the tongue to show its mounting upon the platform, the view being taken on line 21 21 of Fig. 7.

Referring now to the drawing for a more particular description, I provide a truck of any suitable form, its pair of wheels 1 having a limited height so that it may work under a motor vehicle to advantage and its axle 2 being provided with a horizontal extension or reach 3 having an aperture 4 (Fig. 6.) formed therein near its terminal and an upset, apertured projection or collar 5 at said aperture, the axle 2 being formed rectilinear on its upper side as indicated at *a* to provide a slide-plate.

At 6 is indicated a platform adapted to lie loosely upon the axle and having a width considerably less than the distance between the wheels of the truck. It is preferably formed with convergent sides and is provided between its middle and ends with vertically formed apertures or socket-members 7 and 8 each being provided with upset, annular projections *c* for receiving a supporting-pin; and midway between the socket-members a pair of elongated slots or apertures 10 are formed in the bottom of the platform to extend transversely thereof; also the platform is provided, outwardly of apertures 7 and 8, and in alinement therewith, with apertures 11 and 12, said apertures being equi-distant from an aperture 7 or 8. The platform thus provided may be removably secured to the truck by means of a bolt 13 seated in the aperture 4 of the reach and traversing one of the apertures 11 or 12 of said platform, a pair of bolts 14 being employed for the axle and adapted to be disposed in the elongated apertures 10 of the platform, a pair of washers 15 (Fig. 7.) being arranged for loosely engaging the upper side of the platform while mounted on said bolts. A tongue is indicated at 16 consisting preferably of telescoping sections and arranged to be connected as shown, said tongue being non-rotatably and conveniently connected with the platform by means of the lug 17 (Fig. 8.) of the platform seated in an aperture 18, formed in the inner end of said tongue, while the parts are secured by the U-bolts 19.

As thus described it will be seen that the platform which carries the tongue, may be reversed upon the truck so that, as shown in Figs. 1 and 2, its wheels may be disposed intermediate the axles of a disabled automobile to thereby support the weight to the best advantage when the automobile is drawn or towed to a garage for repairs. Also it will be seen that when moving upon curves, the platform may have a limited swinging movement upon the truck, this being of great advantage since the wheels of the truck must have a very limited diameter and the weight to be sustained will be comparatively great. Also on account of the flexible mounting provided by the washers 15 in connection with the bolts 14 and the provision of the apertures 10, the stresses will be sustained to advantage when one of the automobile wheels or a wheel of the truck enters a rut or passes over an obstruction upon a road bed.

It will be appreciated that, when the device is in use, the pivotal mounting for the platform will always be disposed at the front of the axle of the truck and during the forward movement of the truck the platform moves as a trailer behind its pivotal mounting to permit the desired lateral swinging movement of said platform, independent of the truck, while engaging the flat bearing $a$ of the axle. Since the axles of motor vehicles have various forms, the members to be interposed between the upper part or head of the supporting pin 9 and these axles have different forms. If both wheels of the front axle are injured, the saddle indicated at 20 may be employed to advantage. It is provided with sides $d$ having a curvature corresponding to the curvature of the prongs $e$ of the supporting-pin 9 for a seating therebetween, and is provided with a downwardly projecting flange $f$ adapted to have a seating in the groove $g$ of the supporting-pin, and by means of a bolt 21 (Fig. 8) the saddle may be secured to the prongs $e$, suitable screw-bolts 22 being employed for securing the sides $d$ to the front axle 23 of the vehicle, as best shown in Fig. 3.

As best shown in Figs. 15 and 16, the bottom of the saddle 20, on its inner side is provided with a pair of projections 24 to be used as bearings upon which the front axle may rest. The flange $f$ of this saddle, as best shown in Fig. 14, is provided with a pair of projections $h$ normally disposed adjacent to the bottom of the groove $g$. The construction thus described permits a limited rocking movement of the axle 23 together with the saddle mentioned, which is a very useful feature, since one of the wheels of the truck or the wheels of a disabled vehicle, when being moved, may encounter obstructions, and the limited flexible movement thus provided, tends to prevent breakage, and thereby being of advantage as compared to a rigid connection.

The saddle indicated at 25, and best shown in Figs. 18, 19 and 20, may be used for supporting a rear axle 26 or a front axle of a disabled vehicle, its downwardly projecting flange $f'$ being disposed in the groove $g$ of a supporting-pin 9, these saddles being used in instances when a single wheel is disabled, the bolts 21 being employed for connecting the parts, and as shown in Fig. 4, the saddle may be dispensed with in instances where the bolt 21 may be interposed between the truss rod 27 and the rear axle.

In operation, after the axle of a vehicle has been elevated by use of a lifting-jack or other means, the supporting-pin may also be elevated, and may be maintained in an elevated position for supporting the weight of the vehicle by use of washers 28, each being provided with a recess $m$ opening on one of its sides so that it may be moved horizontally to partly encircle the lower part of the supporting-pin, these washers, props or blocks each being provided, preferably, with an upright tapered part $n$ adapted to have a seating in an annular recess $p$ formed in the lower end of an adjacent washer, and tending, during operation, to prevent disconnection with the projection $c$ of the platform, or separation from each other.

Having fully described the several parts and their functions, a further explanation relating to operation is not necessary.

What I claim as my invention and desire to secure by Letters Patent is,—

1. In devices for the purpose described, a truck provided with a pair of wheels and a forwardly extending arm, a platform adapted to lie loosely on the truck and having a part extending rearwardly thereof, an upright supporting-pin engaging the rearwardly extending part of the platform and provided with axle-engaging devices, the platform having a pivotal mounting on the arm of the truck to permit swinging movements of said platform in a horizontal plane.

2. In devices for the purpose described, a truck provided with a pair of wheels and a forwardly extending arm, a supporting-pin provided with axle-engaging devices, a platform carried by the truck and arranged to maintain the supporting-pin in an upright position, said platform being arranged for horizontal movements while pivotally connected with the forwardly extending arm of the truck.

3. In devices for the purpose described, a truck consisting of a non-rotatable axle with wheels thereon, said axle having a flat upper surface intermediate the wheels and being provided with a forwardly extending arm, a platform carried by the truck and having a part extending rearwardly thereof, an upright supporting-pin engaging the rearwardly extending part of the platform and provided with axle-engaging devices, said platform being pivotally mounted on the forwardly extending arm of the truck to permit it to move horizontally on the flat upper surface of said axle.

4. In devices for the purpose described, a truck provided with a pair of wheels and a forwardly extending arm, a supporting-pin provided with axle-engaging devices, a platform supported by the truck and having a tongue rigidly mounted thereon and provided with devices for maintaining the supporting-pin in an upright position, said platform being pivotally connected with the forwardly extending arm of the truck to permit the platform and tongue to have horizontal swinging movements.

5. In devices for the purpose described, a truck consisting of a non-rotatable axle with wheels thereon, said axle having a rectilinear part intermediate the wheels and being provided with a forwardly extending arm, a platform carried by the truck, a supporting-pin provided with axle-engaging devices and maintained in an upright position while engaging the platform, said platform being pivotally mounted on the forwardly extending arm of the truck to permit it to move horizontally while engaging the rectilinear part of said axle.

6. In devices for the purpose described, a truck consisting of a non-rotatable axle with wheels thereon, said axle having a flat upper surface intermediate the wheels and being provided with a forwardly extending arm, a platform provided with an aperture and carried by the truck, an upright longitudinally-adjustable supporting-pin engaging the platform and provided with axle-engaging devices, said platform being pivotally mounted on the forwardly extending arm of the truck to permit it to have horizontal movements while engaging the flat upper surface of said axle, and a bolt or equivalent means engaging in the aperture of the platform while connected with the axle for limiting the horizontal movements of said platform.

In testimony whereof, I have affixed my signature in presence of two witnesses.

ALBERT E. BIHLER.

Witnesses:
   HIRAM A. STURGES,
   J. L. JOHNSON.